United States Patent
Han et al.

(10) Patent No.: US 8,341,972 B2
(45) Date of Patent: Jan. 1, 2013

(54) DRIVE CONTROL APPARATUS AND METHOD FOR REFRIGERATOR TYPE FAN MOTOR

(75) Inventors: Seung-Do Han, Seoul (KR); Dong-Il Lee, Seoul (KR); Hyoun-Jeong Shin, Seoul (KR)

(73) Assignee: LG Electronics Inc., Seoul (KR)

( * ) Notice: Subject to any disclaimer, the term of this patent is extended or adjusted under 35 U.S.C. 154(b) by 735 days.

(21) Appl. No.: 12/518,542

(22) PCT Filed: Oct. 8, 2007

(86) PCT No.: PCT/KR2007/004904
§ 371 (c)(1),
(2), (4) Date: Jun. 10, 2009

(87) PCT Pub. No.: WO2008/075828
PCT Pub. Date: Jun. 26, 2008

(65) Prior Publication Data
US 2010/0017039 A1    Jan. 21, 2010

(30) Foreign Application Priority Data

Dec. 20, 2006 (KR) .................. 10-2006-0131217

(51) Int. Cl.
*F25D 17/00* (2006.01)

(52) U.S. Cl. .................. 62/158; 62/179; 62/186

(58) Field of Classification Search .......... 62/179, 62/180, 182, 186, 157, 158; 318/34, 400.01
See application file for complete search history.

(56) References Cited

U.S. PATENT DOCUMENTS

| 6,463,893 | B1 | 10/2002 | Foster et al. |
| 6,593,717 | B2 | 7/2003 | Yoshimura |
| 6,747,432 | B2 | 6/2004 | Yoshimura |
| 6,883,339 | B2 * | 4/2005 | Park et al. ............... 62/180 |
| 7,007,490 | B2 * | 3/2006 | Jeong et al. .............. 62/179 |
| 7,427,841 | B2 * | 9/2008 | Hamaoka et al. ........ 318/400.01 |

FOREIGN PATENT DOCUMENTS

| CN | 1835371 A | 9/2006 |
| JP | 11-173734 | 7/1999 |
| JP | 2003-219683 | 7/2003 |
| JP | 2006-304444 | 11/2006 |
| KR | 10-2005-0056722 A | 6/2005 |
| KR | 10-2006-0061142 | 6/2006 |

OTHER PUBLICATIONS

Chinese Office Action dated Dec. 21, 2010 issued in Application No. 200780047873.6.
Korean Office Action dated Oct. 24, 2012.

* cited by examiner

*Primary Examiner* — Marc Norman
(74) *Attorney, Agent, or Firm* — KED & Associates LLP

(57) ABSTRACT

An apparatus and method for controlling driving of a plurality of fan motors for a refrigerator are provided. When operated, the plurality of fan motors provided in the refrigerator is sequentially operated at certain delay times, to thus improve operation efficiency of the plurality of fan motors. The apparatus for controlling driving of a plurality of fan motors includes blowing devices that supply cool air, a driving device that generates drive signals to drive the blowing devices, a controller that controls operation of the driving device, a power device that provides operation power of the driving device and the controller, and a cutoff device positioned between the driving device and the power device that cuts off noise and a surge voltage introduced from the power device to the driving device.

12 Claims, 4 Drawing Sheets

DRIVE CONTROL APPARATUS AND METHOD FOR REFRIGERATOR TYPE FAN MOTOR

TECHNICAL FIELD

The present invention relates to an apparatus and method for controlling driving of a fan motor for a refrigerator, and more particularly, to an apparatus and method for controlling driving of a fan motor for a refrigerator capable of improving operation efficiency of a plurality of fan motors installed in the refrigerator by sequentially operating the plurality of fan motors at certain delay times.

BACKGROUND ART

In general, a cool air supplying fan motor assembly is installed within a refrigerator in order to supply cool air in the refrigerator.

As the cool air supplying fan motor, an inner rotor type BLDC motor having a magnet rotor within a stator is used.

However, the cool air supplying fan motor can hardly accomplish high efficiency because a fan load is mounted at an inner rotor-type motor or an axial flow fan motor is employed, and because the size is increased in an axial direction and in a radial direction of the motor, the cool air supplying fan motor assembly cannot become compact, resulting in a problem in that the capacity of the refrigerator cannot be increased.

In addition, when the plurality of cool air supplying fan motors provided in the refrigerator are operated simultaneously, an initial operation voltage is instantaneously dropped to cause malfunction.

TECHNICAL GIST OF THE PRESENT INVENTION

Therefore, it is an object of the present invention to provide an apparatus and method for controlling driving of a fan motor for a refrigerator capable of improving operation efficiency of a plurality of fan motors provided in the refrigerator by sequentially operating the plurality of fan motors at certain delay times.

To achieve the above object, there is provided an apparatus for controlling driving of a fan motor used for a refrigerator, including: at least one blowing unit that supplies cool air; a driving unit that generates a drive signal for driving the blowing unit; a control unit that controls operation of the driving unit; a power unit that provides operation power of the driving unit and the control unit; and a cut-off unit that is positioned between the driving unit and the power unit and cuts off noise and a surge voltage introduced from the power unit to the driving unit.

To achieve the above object, there is also provided a method for controlling driving of a fan motor used for a refrigerator, including: determining whether an operation command is inputted; and sequentially operating two or more fan motors in the pre-set order at certain delay times to supply cool air or circulate air within the refrigerator, when an operation command is inputted.

In the present invention, because the plurality of fan motors provided in a refrigerator are sequentially operated at certain delay times, the possibility of voltage drop and generation of operation deficiency can be reduced to thus improve operation efficiency with respect to the plurality of fan motors.

In addition, without an increase in size of the plurality of fan motors provided in the refrigerator, a single MLCC (Multilayer Ceramic Capacitor) is provided to remove noise and a surge voltage, to thus improve reliability of the motors.

MODE FOR CARRYING OUT THE PREFERRED EMBODIMENTS

The operation and effect of the apparatus and method for controlling driving of a fan motor used for a refrigerator according to the present invention will now be described in detail.

First, a fan motor, to which the apparatus and method for controlling driving of a fan motor for a refrigerator according to the present invention is applied, is a device configured by integrally molding a stator and a printed circuit board (PCB) with a thermoplastic material to thus accomplish a compact cool air supplying fan motor assembly.

The fan motor to which the present invention is applied will now be described in detail.

Figure 1:
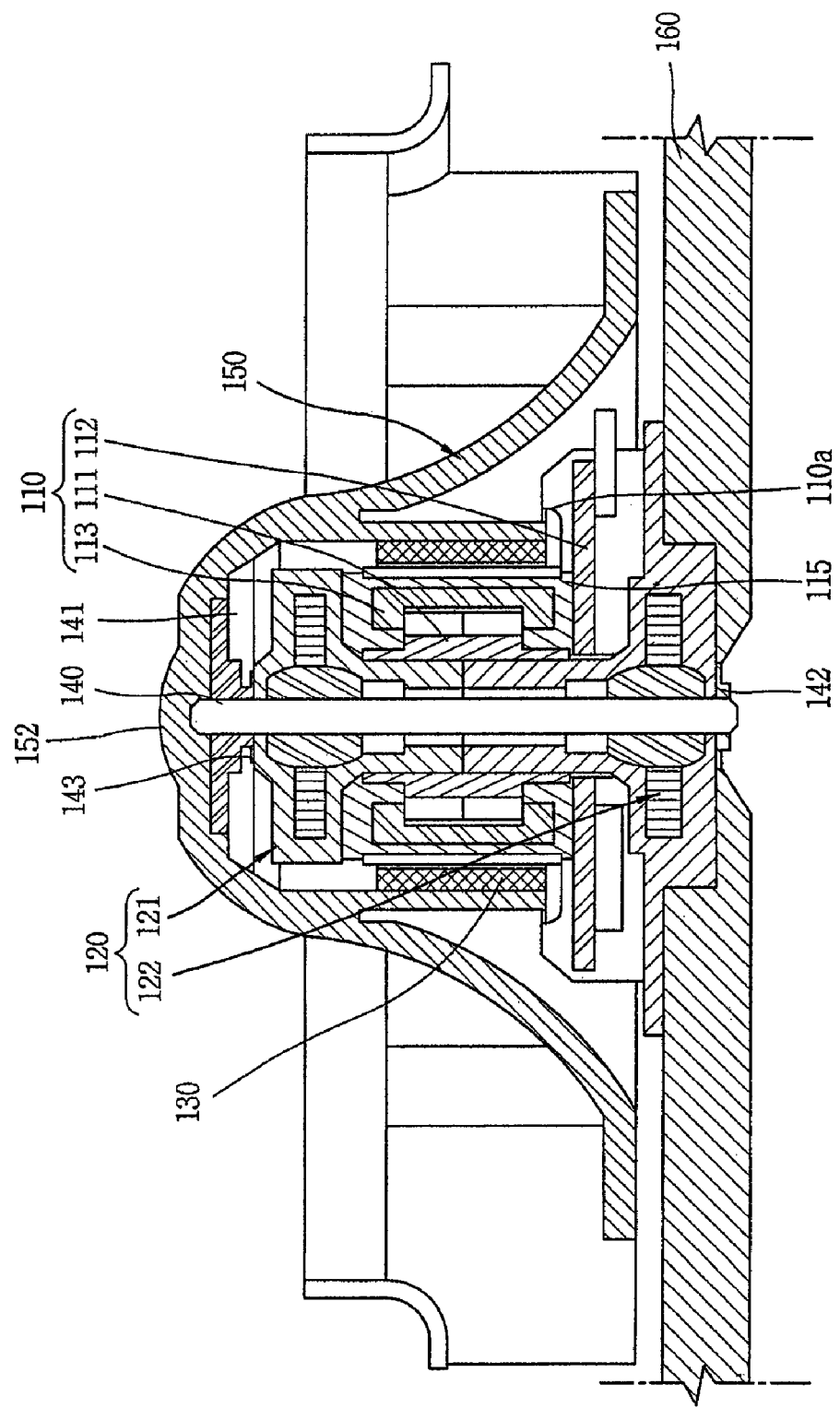
FIG. 1 is a vertical sectional view showing a cool air supplying fan motor assembly according to the present invention.
Figure 2:
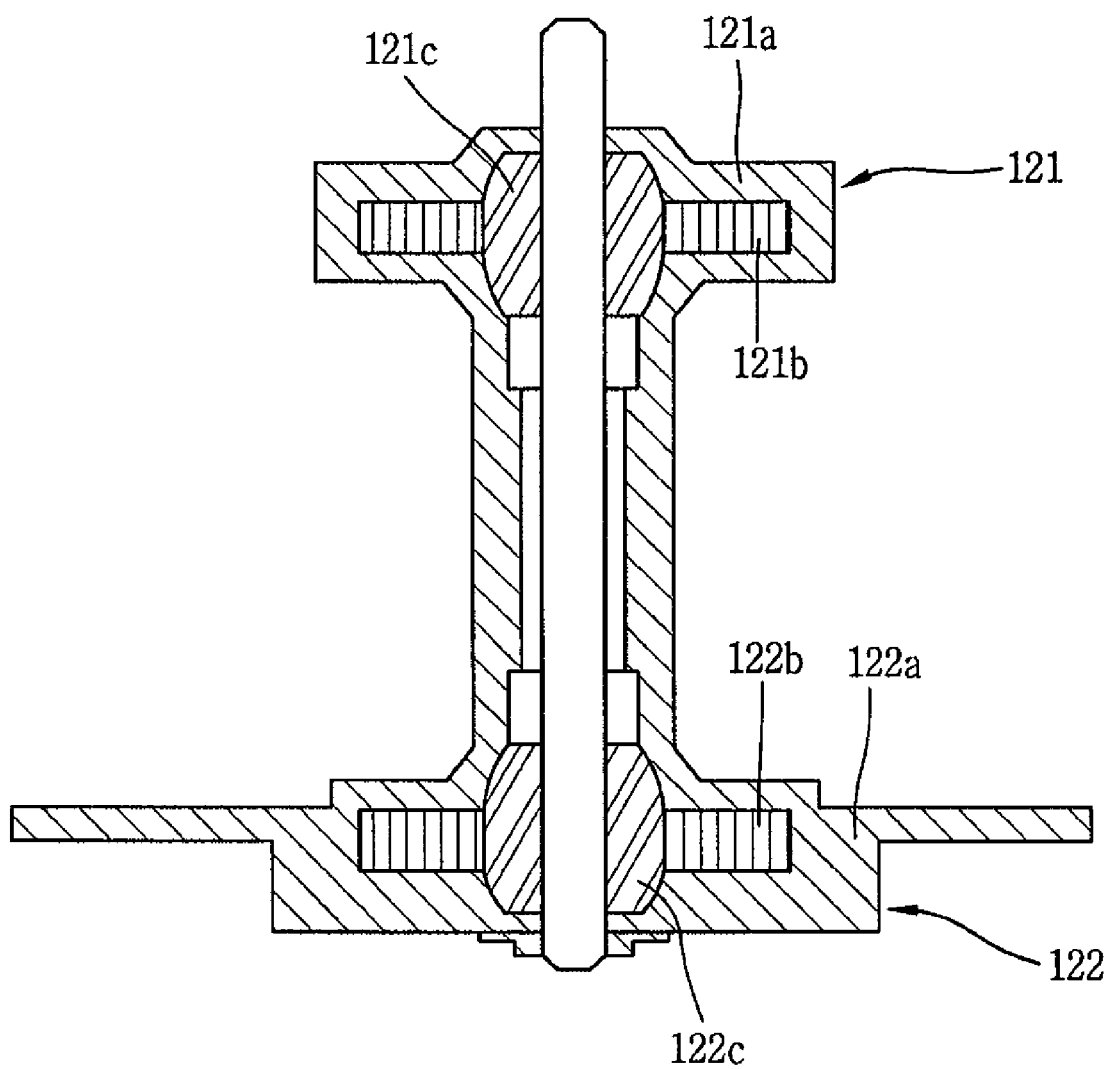
FIG. 2 is a view illustrating a major part in FIG. 1.

FIG. 1 is a vertical sectional view showing a cool air supplying fan motor assembly according to the present invention, and FIG. 2 is a view illustrating a major part in FIG. 1.

As shown, the cool air supplying fan motor assembly 100 according to the present invention includes a stator 11 with a coil 113 wound thereon; a mold type stator assembly 110 configured such that a PCB 112 is integrally molded and connected with one side of the stator 111; a bearing assembly 120 inserted at a central portion of the stator assembly 110; a permanent magnet 130 positioned at an outer side of the stator assembly 110; and a fan 150 including a shaft 140 inserted to be rotatable at a central portion of the bearing assembly 120 and fixed at one side of the permanent magnet 130.

Preferably, the stator assembly 110 is made of a thermoplastic resin, e.g., micromelt.

A protrusion 110a is formed at one face of the stator assembly 110a, by which a foreign material such as water can be prevented from infiltrating into the stator assembly 110 from an outer side of the motor.

The PCB 112 includes a 3-phase drive IC 112a and an MLCC (Multilayer Ceramic Capacitor) 112b.

A hub 151 is formed at an inner central portion of the fan 150, and an outer diameter of the permanent magnet 130 is inserted into the inner diameter of the hub 151. In this state, the permanent magnet 130 is fixed at the hub 151 of the fan 150, and in this case, preferably, a bonding process is used.

A shaft base 141 is fixed at one end portion of the shaft 140 such that the end portion of the shaft 140 may protrude, and the a nipple 152 is formed at a central portion of the fan 150 into which the end of the shaft 140 is inserted. Accordingly, the shaft 140 is inserted into the hub 151 of the fan 150, and the shaft 140 is firmly fixed in the fan 150.

The bearing assembly 120 includes a first bearing assembly 121 positioned at the side of the fan 150 and a second bearing assembly 122 positioned at the opposite side of the fan 150.

As for the first bearing assembly 121, a felt 121b is positioned within a housing 121a, and a bearing 121c, which contacts with the shaft 140, is installed at a central portion of the felt 121b.

As for the second bearing assembly 122, a felt 122b is positioned within a housing 122a, and a bearing 122c, which contacts with the shaft 140, is installed at a central portion of the felt 122b. Preferably, the permanent magnet 130 is a plastic magnet, is parlyene-coated, and anisotropic-magnetized.

Reference numeral 122c denotes a coupling recess, 142 denotes a stop ring inserted into the end of the shaft 140, 115 denotes an insulator, 160 denotes a motor mount plate that supports a motor, 'C' denotes cable, and 143 denotes an oil protector.

Figure 3:
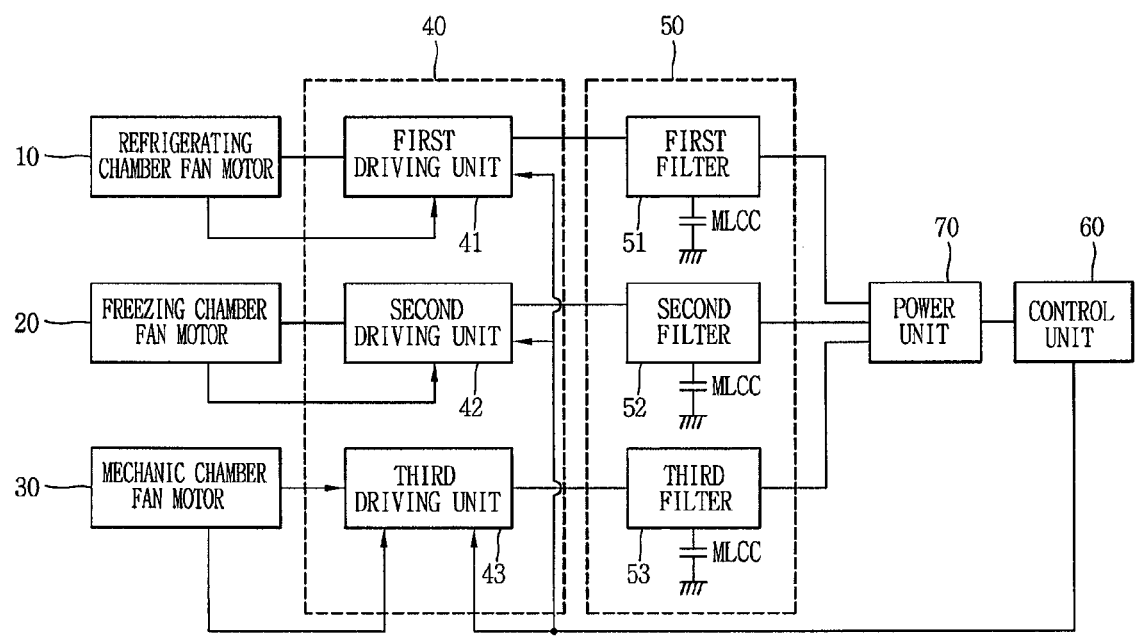
FIG. 3 is a schematic block diagram showing the construction of an apparatus for controlling driving of a fan motor used for a refrigerator according to an embodiment of the present invention.

FIG. 3 is a schematic block diagram showing the construction of an apparatus for controlling driving of a fan motor used for a refrigerator according to an embodiment of the present invention.

As shown in FIG. 3, the apparatus for controlling driving of a fan motor for a refrigerator includes a refrigerating chamber fan motor 10, a freezing chamber fan motor 20, a mechanic chamber fan motor 30, a driving unit 40, a control unit 60, a power unit 70, and cutoff unit 50.

The fan motors 10, 20 and 30 may be additionally configured according to the size or characteristics of the refrigerator. For example, when two fan motors can be used for the refrigerating chamber or two fan motor may be additionally used for the freezing chamber. Accordingly, more driving units may be used to drive the respective fan motors. However, basically, there is no problem in applying the present invention in which the respective fan motors are sequentially controlled at certain time intervals.

The refrigerating chamber fan motor 10 supplies cool air to a refrigerating chamber.

The freezing chamber fan motor 20 supplies cool air to a freezing chamber.

The mechanic chamber fan motor 30 lowers temperature of a compressor (not shown) by circulating air in a mechanic chamber.

The driving unit 40 generates drive signals for driving the refrigerating chamber fan motor 10, the freezing chamber fan motor 20 and the mechanic chamber fan motor 30.

Here, the driving unit 40 includes a first driving unit 41 that drives the refrigerating chamber fan motor 10, a second driving unit 42 that drives the freezing chamber fan motor 20, and a third driving unit 43 that drives the mechanic chamber fan motor 30.

The first driving unit 41 detects a position of a rotor with a counter electromotive force of the refrigerating chamber fan motor, and drives the refrigerating chamber fan motor according to the detection result. The second driving unit 42 detects a position of the rotor with a counter electromotive force of the freezing chamber fan motor and drives the freezing chamber fan motor according to the detection result. The third driving unit 43 detects a position of the rotor with a counter electromotive force of the mechanic chamber fan motor and drives the mechanic chamber fan motor according to the detection result.

The control unit 60 controls the operations of the first, the second, and the third driving units 41, 42, and 43 such that the refrigerating chamber fan motor 10, the freezing chamber fan motor 20 and the mechanic chamber fan motor 30 are sequentially operated at certain delay times.

The cutoff unit 50 is positioned between the driving unit 40 and the power unit 70 and cuts off noise and a surge voltage generated from the power unit 70.

Here, the cutoff unit 50 includes a first filter 51 that removes noise and a surge voltage and smoothes voltage applied to the first driving unit 41, a second filter 52 that removes noise and a surge voltage and smoothes voltage applied to the second driving unit 42, and a third filter 53 that removes noise and a surge voltage and smoothes voltage applied to the third driving unit 43.

In order to reduce external noise and the surge voltage, a single large capacity MLCC, instead of a noise reducing bypass capacitor, is used as the first, the second, and the third filters 51, 52 and 53.

Figure 4:
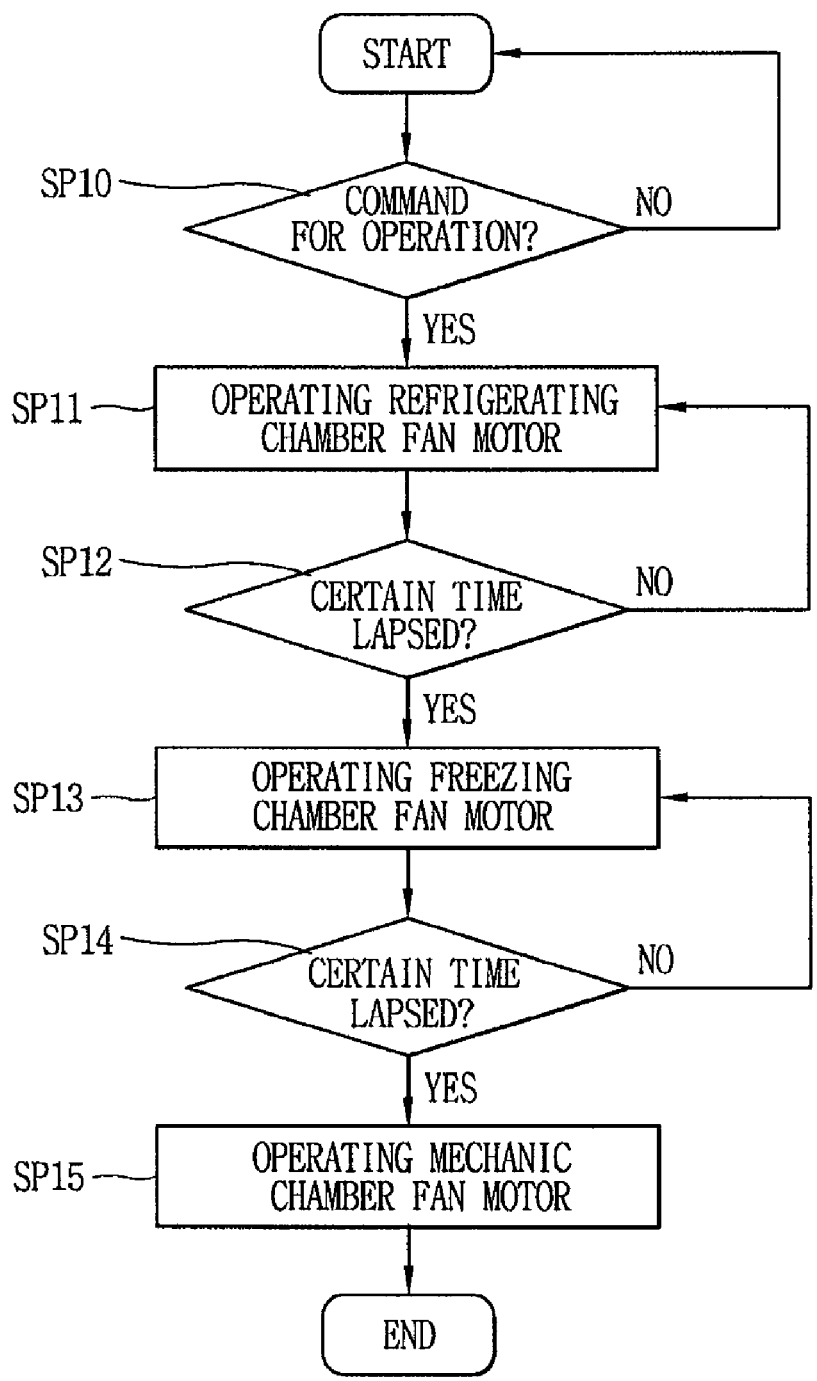
FIG. 4 is a flow chart illustrating the process of a method for controlling driving of a fan motor used for a refrigerator according to the present invention.

The operation of the present invention will now be described with reference to FIG. 4.

First, the control unit 60 checks whether or not a fan motor operation command for supplying cool air in the refrigerator is inputted (SP10). When the fan motor operation command is inputted, the control unit 60 applies control signals for driving the refrigerating chamber fan motor 10, the freezing chamber fan motor 20 and the mechanic chamber fan motor 30 to the driving unit 40 (SP11~SP15).

In this case, the control unit 60 sequentially generates the control signals for driving the refrigerating chamber fan motor 10, the freezing chamber fan motor 20 and the mechanic chamber fan motor 30 at certain delay time intervals (about one second, but not limited thereto and it can be variably set by less than or more than the delay time one second according to characteristics of each element).

Here, the operation order of the refrigerating chamber fan motor 10, the freezing chamber fan motor 20 and the mechanic chamber fan motor 30 may be previously set, and any type of combinations may be used.

Namely, the refrigerating chamber fan motor 10, the freezing chamber fan motor 20, the mechanic chamber fan motor 30 may be operated in sequence at certain delay times. Or, the refrigerating chamber fan motor 10, the mechanic chamber fan motor 30 and the freezing chamber fan motor 20 may be operated in sequence at certain delay times. Or, the freezing chamber fan motor 20, the refrigerating chamber fan motor 10, the mechanic chamber fan motor 30 may be operated in sequence at certain delay times. Or, the freezing chamber fan motor 20, the mechanic chamber fan motor 30 and the refrigerating chamber fan motor 10 may be operated in sequence at certain delay times. Or, the mechanic chamber fan motor 30, the refrigerating chamber fan motor 10 and the freezing chamber fan motor 20 may be operated in sequence at certain delay times. Or, the mechanic chamber fan motor 30, the freezing chamber fan motor 20 and the refrigerating chamber fan motor 10 may be operated in sequence at certain delay times.

Accordingly, the driving unit 40 sequentially outputs drive signals for driving the refrigerating chamber fan motor 10, the freezing chamber fan motor 20 and the mechanic chamber fan motor 30 at certain delay times according to the control signals (e.g., operating in the order of the refrigerating chamber fan motor, the freezing chamber fan motor and the mechanic chamber fan motor) outputted from the control unit 60.

Namely, the first driving unit 41 outputs a first drive signal for driving the refrigerating chamber fan motor 10 under the control of the control unit 60, the second driving unit 42 outputs a second driver signal for driving the freezing chamber fan motor 20 under the control of the control unit 60, and the third driving unit 43 outputs a third drive signal for driving the mechanic chamber fan motor 30 under the control of the control unit 60.

Accordingly, the refrigerating chamber fan motor 10 is operated by the first drive signal, and after a certain time (about one second), the freezing chamber fan motor 20 is operated by the second drive signal, and after a certain time (about one second), the mechanic chamber fan motor 30 is operated by the third drive signal.

At this time, the power unit 70 supplies operation power to the driving unit 40, the control unit 60, the refrigerating chamber fan motor 10, the freezing chamber fan motor 20 and the mechanic chamber fan motor 30.

Here, when the power unit 70 supplies power, noise and a surge voltage may be generated from the power.

In addition, EMI noise may be generated due to external power.

Thus, in order to reduce noise, in the related art, a bypass capacitor is provided between the power unit 70 and the control unit 60, but in the present invention, the cutoff unit 50 for cutting off noise, a surge voltage and external EMI noise is provided between the power unit 70 and the control unit 60.

The cutoff unit 50 removes noise and a surge voltage, and includes the first, the second and the third filters 51, 52 and 53 that smooth the voltage applied to the driving unit 40.

Here, the first, the second and the third filters 51, 52 and 53 include the MLCC.

INDUSTRIAL APPLICABILITY

As so far described, in operating, the plurality of fan motors provided in the refrigerator are sequentially operated at certain delay times to thus improve the operation efficiency of the plurality of fan motors, and removing noise and the surge voltage by using the single MLCC.

Meanwhile, in the above description of the embodiment of the present invention, all the fan motors installed in the refrigerator are driven in the pre-set certain order, but this happens on the assumption that all the fan motors are operated. Thus, if some fan motors are driven, namely, if other fan motors are excluded from driving, only the fan motors desired to be driven can be driven according to the pre-set order.

Although certain embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments, but are defined by the claims which follow, along with their full scope of equivalents.

The invention claimed is:

1. An apparatus for controlling driving of a plurality of fan motors used for a refrigerator, the apparatus comprising:
   a plurality of blowing devices that supplies cool air;
   a drive that generates drive signals that drive the plurality of blowing devices;
   controller that controls operation of the drive;
   a power device that provides operation power to the drive and the controller; and
   a cut-off device positioned between the drive and the power device, that cuts off noise and a surge voltage introduced from the power device to the drive, wherein the controller sequentially operates the plurality of blowing devices at predetermined delay times according to a preset order regardless of a temperature of the refrigerator.

2. The apparatus of claim 1, wherein each the plurality of blowing devices comprises:
   a refrigerating chamber fan motor that supplies cool air to a refrigerating chamber;
   a freezing chamber fan motor that supplies cool air to a freezing chamber; and
   a mechanic chamber fan motor that circulates air in a mechanic chamber.

3. The apparatus of claim 1, wherein the drive comprises a plurality of driving devices that drive respective fan motors of the plurality of blowing devices.

4. The apparatus of claim 3, wherein the drive detects a position of a rotor of each fan motor of the plurality of blowing devices, and wherein the drive drives each fan motor of the plurality of blowing devices according to the detection result.

5. The apparatus of claim 1, wherein the cutoff device comprises one or more filter that removes noise and a surge voltage generated from the power device and smoothes voltage applied to the drive.

6. The apparatus of claim 5, wherein the one or more filter comprises at least one MLCC (Multilayer Ceramic Capacitor).

7. The apparatus of claim 1, wherein the predetermined delay times are variably set up to or more than one second.

8. A method for controlling driving of a plurality of fan motors used for a refrigerator, the method comprising:
   determining whether an operation command is input; and
   when the operation command is input, sequentially operating the plurality of fan motors according to a preset order at predetermined delay times, to supply cool air or circulate air within the refrigerator, regardless of a temperature of the refrigerator.

9. The method of claim 8, further comprising:
   previously setting the predetermined delay times and the pre-set operation order.

10. The method of claim 8, wherein the plurality of fan motors is operated to supply cool air to a refrigerating chamber and a freezing chamber, or circulate air in a mechanic chamber.

11. The method of claim 8, further comprising generating a plurality of drive signals that sequentially operates the plurality of fan motors according to the preset order at the predetermined delay times.

12. The method of claim 11, wherein the plurality of drive signals is generated by a drive according to a plurality of control signals generated by a controller.

* * * * *